(12) United States Patent
Boyeldieu

(10) Patent No.: US 8,980,039 B2
(45) Date of Patent: Mar. 17, 2015

(54) DEVICE FOR THE PRODUCTION OF A COMPOSITE MATERIAL PIECE THAT COMPRISES SMOOTHING PANELS WITH SLIDING JUNCTIONS AND PROCESS FOR THE PRODUCTION OF SMOOTHING PANELS WITH SLIDING JUNCTIONS

(75) Inventor: Aurélien Boyeldieu, Saint Sebastien (FR)

(73) Assignee: Airbus Operations, SAS, Toulouse (FR)

( * ) Notice: Subject to any disclaimer, the term of this patent is extended or adjusted under 35 U.S.C. 154(b) by 607 days.

(21) Appl. No.: 12/863,788

(22) PCT Filed: Jan. 29, 2009

(86) PCT No.: PCT/FR2009/050132
§ 371 (c)(1),
(2), (4) Date: Oct. 8, 2010

(87) PCT Pub. No.: WO2009/095619
PCT Pub. Date: Aug. 6, 2009

(65) Prior Publication Data
US 2011/0017389 A1      Jan. 27, 2011

(30) Foreign Application Priority Data

Jan. 31, 2008   (FR) ...................................... 08 50609

(51) Int. Cl.
*B29C 70/34* (2006.01)
*B29C 70/44* (2006.01)
(Continued)

(52) U.S. Cl.
CPC ........... *B29C 70/446* (2013.01); *B29C 33/0011* (2013.01); *B29C 33/68* (2013.01)
USPC ......................................... 156/245; 156/538

(58) Field of Classification Search
CPC .... B29C 33/0011; B29C 33/68; B29C 70/446
USPC ......................................................... 156/245
See application file for complete search history.

(56) References Cited

U.S. PATENT DOCUMENTS 5,474,837 A * 12/1995 Duke et al. ..................... 442/412
5,538,589 A *  7/1996 Jensen et al. ................... 156/581

(Continued)

FOREIGN PATENT DOCUMENTS

FR       1 338 785 A    9/1963
FR       2 710 871 A1   4/1995

(Continued)

OTHER PUBLICATIONS

International Search Report, dated Mar. 2, 2010, from corresponding PCT application.

*Primary Examiner* — Philip Tucker
*Assistant Examiner* — Vicki Wu
(74) *Attorney, Agent, or Firm* — Young & Thompson

(57) ABSTRACT

A device for the production of a part of an aircraft made of composite material of which one surface is able to be in contact with aerodynamic flows includes a male mold, and at least two smoothing panels (12) that can exert pressure on the piece to be produced during a polymerization phase during which a contraction phenomenon appears. At least one of the two smoothing panels (12.1, 12.2) includes a smooth edge with a beveled shape against which at least one surface of the other smoothing panel can slide to compensate for the contraction phenomenon.

12 Claims, 1 Drawing Sheet

Figure 1:
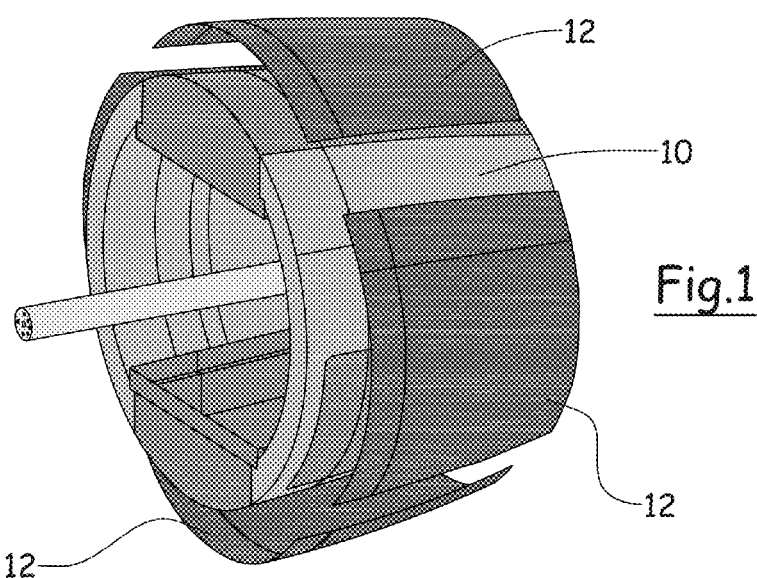

(51) Int. Cl.
*B29C 33/00* (2006.01)
*B29C 33/68* (2006.01)

(56) References Cited

U.S. PATENT DOCUMENTS 6,464,814 B2 * 10/2002 Teramoto et al. ............ 156/199

2009/0020645 A1    1/2009   Cacciaguerra
2010/0239865 A1 *  9/2010   Kallinen .................... 428/411.1

FOREIGN PATENT DOCUMENTS

| FR | 2710871 A1 * | 4/1995 |
| FR | 2 894 869 A1 | 6/2007 |
| WO | 98/32589 A1 | 7/1998 |

* cited by examiner

DEVICE FOR THE PRODUCTION OF A COMPOSITE MATERIAL PIECE THAT COMPRISES SMOOTHING PANELS WITH SLIDING JUNCTIONS AND PROCESS FOR THE PRODUCTION OF SMOOTHING PANELS WITH SLIDING JUNCTIONS

This invention relates to a device for the production of a composite material piece that comprises smoothing panels with sliding junctions as well as a process for the production of smoothing panels with sliding junctions.

Aeronautical design tends to rely on composite materials for the production of certain parts of an aircraft, in particular the panels that form the outside skin of the fuselage, so as to reduce the on-board weight. The document FR-2,894,869 describes a process for the production of an aircraft fuselage made of composite material.

The pieces that are made of composite material comprise a resin matrix that is reinforced by fibers. According to one common embodiment, the fibers come in the form of one or more fold(s) that may or may not be woven and that are pre-impregnated with resin. As a variant, the fibers may not be pre-impregnated. In this case, at least one resin film is used.

To ensure the consolidation of the composite material piece, it is necessary to increase the temperature to obtain the polymerization of the resin. Pressure is exerted during the polymerization so as to expel the air and the solvents, to reduce the porosity, and to prevent risks of defects able to reduce the mechanical characteristics of the piece.

In the case of one part of the fuselage, the composite piece is draped on a male mold and covered by a compacting bladder.

Drainage means, in the form of a draining fabric, are inserted between the piece and the bladder.

According to this operating mode, the surface that is not in contact with the mold corresponds to the outside surface of the fuselage. However, by contact with significant aerodynamic streams, this surface should have a surface condition that imparts the best aerodynamic characteristics to the aircraft. Actually, the surface defects produce an increase of the drag and consequently an increase of the energy consumption of the aircraft.

So as to shape the surface of the piece that is not in contact with the mold, a panel, called a smoothing panel, is placed between the piece and the bladder. It makes it possible, on the one hand, to achieve the required soundness, ruggedness, surface appearance and strength of the aerodynamic tolerances, and, on the other hand, to homogenize the distribution of pressure forces exerted by the bladder on the surface of the piece.

In the case of a fuselage panel, the outside surface that is in contact with the smoothing panel is not flat, but curved, and it can extend over 360° in the case of a fuselage section. In this case, the piece of equipment generally comprises several smoothing panels that are placed end to end.

During the polymerization, the composite material piece will decrease in thickness, which is reflected by a size reduction of the contact surface with the smoothing panels. This phenomenon is called contraction.

Despite this phenomenon, the smoothing panels are to transmit a homogeneous pressure throughout the polymerization.

Taking into account this size reduction, for example on the order of 9 mm for a diameter of 2 m, the smoothing panels are not contiguous before the polymerization.

According to a first variant, the smoothing panels have an edge-to-edge- or stairway-type junction.

In this case, with pressurization occurring before the end of the contraction, a pile of resin forms in the spaces left at each junction, giving rise to a marking line at the outside surface that is thus produced.

According to another variant, for each junction, the edges of the opposite smoothing panels comprise free wires that are installed alternately from one panel to the next between the two panels.

Although this solution ensures an almost complete covering of the surface at any time, the flexibility of the wires does not allow the pressurization to the right of the wires, which is reflected by a marking of the wires in the piece after polymerization.

Also, the purpose of this invention is to remedy the drawbacks of the prior art by proposing a device for the production of a composite material piece that comprises smoothing panels that make it possible to obtain a piece that has the required characteristics in terms of aerodynamics.

For this purpose, the invention has as its object a device for the production of a part of an aircraft that is made of composite material and whose surface is able to be in contact with the aerodynamic flows, whereby said device comprises, on the one hand, a male mold, and, on the other hand, at least two smoothing panels that can exert pressure on the piece that is to be produced during a polymerization phase during which a contraction phenomenon appears, characterized in that at least one of the two smoothing panels comprises a smooth edge with a beveled shape against which at least one surface of the other smoothing panel can slide to compensate for the contraction phenomenon.

With the contraction of the material taking place at the latest when the resin reaches its minimum viscosity, the appearance of marking is no longer possible because there is no longer a gap between the smoothing panels thanks to the shape of at least one of the edges.

Figure 2:
Figure 3:
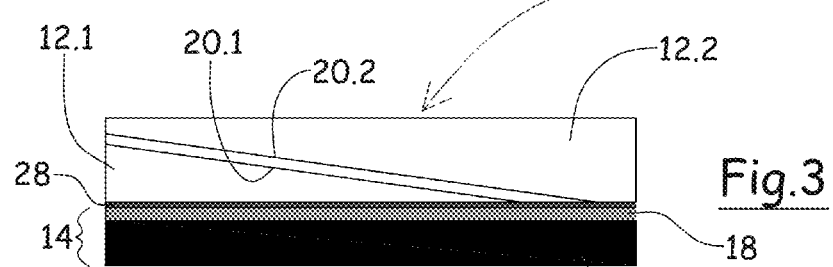
Figure 4:
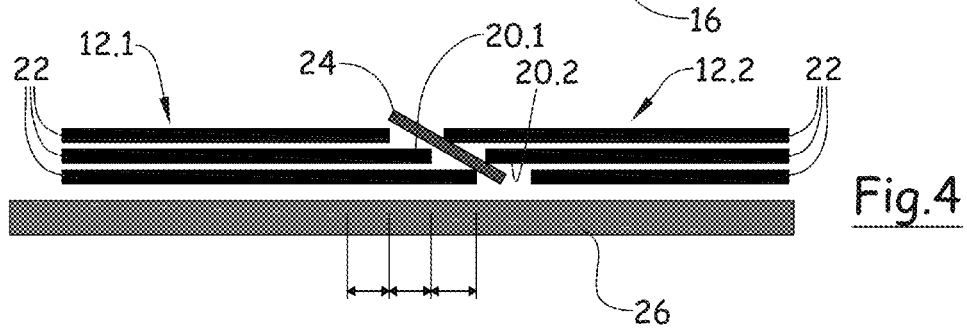

Other characteristics and advantages will emerge from the following description of the invention, a description that is provided only by way of example, relative to the accompanying drawings in which:

FIG. 1 is a perspective view of a piece of equipment that is used to produce a part of the fuselage of an aircraft that is made of composite material, FIG. 2 is a cutaway that illustrates the junction of the smoothing panels according to the invention, FIG. 3 is a cutaway that illustrates in detail the junction of FIG. 2, and FIG. 4 is a cutaway that illustrates the process for production of smoothing panels with sliding junctions.

FIG. 1 shows a part of a piece of equipment for producing a part of the fuselage of an aircraft that comprises a male mold 10 as well as at least two smoothing panels 12. The other parts of the piece of equipment, namely the bladder, the sealing means, the means for creating negative pressure, and draining means, are not shown and described because they are known to one skilled in the art.

At 14, FIGS. 2 and 3 show a composite material piece that comprises a resin matrix that is reinforced by fibers. According to a common embodiment, the fibers come in the form of one or more fold(s) 16 that may or may not be woven and are pre-impregnated with resin. As a variant, the fibers may not be pre-impregnated. In this case, at least one resin film 18 is used.

A process for the production of one composite material piece consists in draping at least one fold of pre-impregnated fibers 16 or at least one fold of non-impregnated fibers 16 and at least one resin film 18 on the convex male mold and installing the other parts of the piece of equipment and more particularly the smoothing panels 12. To ensure the consolidation of the composite material piece, it is necessary to increase the temperature to obtain the polymerization of the resin and to exert pressure during the polymerization so as to expel the air and the solvents to reduce the risks of defects that can reduce the mechanical characteristics of the piece.

This pressure on the piece is exerted in particular by the smoothing panels 12.

During the polymerization, the composite material piece will decrease in thickness, which is reflected by a reduction of at least one dimension of the contact surface with the smoothing panels 12. This phenomenon is called contraction.

According to the invention, the piece of equipment comprises at least two smoothing panels 12.1 and 12.2 whose opposite edges 20.1 and 20.2 are smooth and have beveled shapes that work together. The angle between the edge and the tangent to the contact surface is less than 5° and preferably less than 1°.

Advantageously, the smoothing panels have a slight thickness of between 1 and 2 mm, imparting to them a flexibility, in particular at the beveled shape. This thickness is adjusted based on the mold curvature radius such that the smoothing panel can easily match this radius. Thus, the smaller the curvature radius of the mold, the smaller the thickness of the smoothing panels.

According to a simplified variant, at a junction of two smoothing panels, only one edge is smooth and has a beveled shape, whereby at least one surface of the other smoothing panel, in particular the surface in contact with the piece to be produced, slides on said edge.

The combination of a small angle at least one of the contiguous edges and a flexibility of the smoothing panels allows a permanent contact during the sliding period, which makes it possible to avoid the pile of resin at the junction between the smoothing panels. Thus, with the contraction of the material taking place at the latest when the resin reaches its minimum viscosity, the appearance of marking is no longer possible because there is no longer a gap between the smoothing panels thanks to the shapes of the edges.

This configuration makes it possible also to obtain a homogeneous pressurization and to limit the risks of surface defects.

The smaller the angle, the more homogeneous the pressurization. However, it is necessary to find a good compromise between the fragility of this fine thickness and the rigidity of the smoothing panel.

According to one embodiment, the smoothing panels 12.1 and 12.2 are obtained by the stacking of folds 22 of fibers immersed in a resin. To obtain the beveled shape, releases of folds are implemented; namely, the folds are arranged in a suitable manner to obtain a stair shape at the edge as illustrated in FIG. 4.

To obtain a smooth edge, a rigid shim 24 with a smooth surface that can be in contact with the edge to be shaped can be used before the polymerization of the resin.

Advantageously, the contiguous smoothing panels 12.1 and 12.2 are produced during the same polymerization operation. Thus, as illustrated in FIG. 4, the folds of each panel are stacked on one another on a mold 26, whereby the folds are positioned so as to obtain complementary slopes for the opposite edges 20.1 and 20.2. To obtain smooth edges, a fine and rigid shim 24—whose opposite surfaces in contact with the edges are parallel and smooth—is inserted between said edges.

After polymerization, the shim is removed so as to obtain smooth edges.

The use of a shim makes it possible to obtain a frosty appearance of the resin at the interface and thus to reduce the friction coefficient that makes it possible for the two edges to slide easily against one another despite the pressure.

According to another characteristic of the invention, a tear-away film 28 is inserted between the smoothing panels and the piece to be produced at least at junction zones between the smoothing panels. This tear-away fabric 28 forms a barrier for the resin and optionally the fibers before the contraction, when the resin has a maximum viscosity. Thus, this tear-away fabric 28 prevents elements from sliding into the existing gap before the contraction.

Finally, the initial separation between the smoothing panels is based on the size reduction that originates from the contraction phenomenon and the number of junctions. Thus, it is possible to reduce the surface defects by increasing the number of smoothing panels and consequently the number of junctions.

However, too high a number of smoothing panels leads to a process that is difficult to implement. Thus, the number of smoothing panels will be adjusted so as to obtain a compromise between these two constraints.

The invention claimed is:

1. Device for the production of a part of an aircraft made of composite material with a first surface and a second surface, one of said first and second surface being able to be in contact with aerodynamic flows, said device comprising:
   a male mold (10) in contact with the first surface;
   a compacting bladder; and
   at least two smoothing panels (12) arranged between the compacting bladder and the second surface that can exert pressure on the second surface during a polymerization phase during which a contraction phenomenon appears, said at least two smoothing panels (12) being different from the male mold (10),
   wherein at least one of the two smoothing panels (12.1, 12.2) comprises a smooth edge with a beveled shape against which at least one surface of the other smoothing panel can slide at a contact surface between the smoothing panels, during a sliding period, to compensate for the contraction phenomenon, and
   wherein the smoothing panels have a thickness of between 1 and 2 mm, giving the smoothing panels flexibility.

2. Device for the production of a part of an aircraft made of composite material according to claim 1, wherein said at least two smoothing panels (12.1, 12.2) have smooth opposite edges (20.1, 20.1) with beveled shapes that work together so as to slide relative to one another.

3. Device for the production of a part of an aircraft made of composite material according to claim 1, wherein the beveled edge forms an angle between the edge and the tangent to the contact surface that is less than 5°.

4. Device for the production of a part of an aircraft made of composite material according to claim 1, further comprising a tear-away film (28) inserted between the smoothing panels and the part to be produced at least at the junction zones between the smoothing panels.

5. Device for the production of a part of an aircraft made of composite material according to claim 2, wherein the beveled edge forms an angle between the edge and the tangent to the contact surface that is less than 5°.

6. Device for the production of a part of an aircraft made of composite material according to claim 2, further comprising a tear-away film (28) inserted between the smoothing panels and the part to be produced at least at the junction zones between the smoothing panels.

7. Device for the production of a part of an aircraft made of composite material according to claim 3, further comprising a tear-away film (28) inserted between the smoothing panels and the part to be produced at least at the junction zones between the smoothing panels.

8. Device for the production of a part of an aircraft made of composite material according to claim 1, wherein the beveled edge forms an angle between the edge and the tangent to the contact surface that is less than 1°.

9. Device for the production of a part of an aircraft made of composite material with a first surface and a second surface, one of said first and second surface for contact with aerodynamic flows, said device comprising:
- a male mold (10) arranged for contact with the first surface of the composite material;
- a compacting bladder; and
- at least two smoothing panels (12) arranged between the compacting bladder and the second surface of the composite material so that the composite piece is draped on the male mold and covered by a compacting bladder, the compacting bladder arranged to exert pressure on the second surface of the composite material during a polymerization phase during which a contraction phenomenon appears, said at least two smoothing panels (12) being discrete from and different from the male mold (10),
- wherein at least one of the two smoothing panels (12.1, 12.2) comprises a smooth edge with a beveled shape against which at least one surface of the other smoothing panel is arranged to slide at a contact surface between the smoothing panels, during a sliding period, to compensate for the contraction phenomenon, and
- wherein the smoothing panels have a thickness of between 1 and 2 mm, giving the smoothing panels flexibility, and the edges and the flexibility of the smoothing panels providing a permanent contact, between the smoothing panels at the contact surface, during the sliding period to avoid piling of resin at the contact surface between the smoothing panels.

10. Device for the production of a part of an aircraft made of composite material according to claim 9, wherein further comprising a tear-away film barrier (28) inserted between the smoothing panels and the second surface of the composite material at least at across junction zones between the smoothing panels blocking material from the second surface of the composite material from entering into a gap between the smoothing panels.

11. Device for the production of a part of an aircraft made of composite material according to claim 9, wherein the beveled edge forms an angle between the edge and the tangent to the contact surface that is less than 1°.

12. Device for the production of a part of an aircraft made of composite material according to claim 9, wherein the beveled edge forms an angle between the edge and the tangent to the contact surface that is less than 5°.

* * * * *